United States Patent
Liu et al.

(10) Patent No.: US 12,204,815 B2
(45) Date of Patent: Jan. 21, 2025

(54) ADAPTIVE AUDIO DELIVERY AND RENDERING

(71) Applicant: Tencent America LLC, Palo Alto, CA (US)

(72) Inventors: Shan Liu, San Jose, CA (US); Jun Tian, Belle Mead, NJ (US); Xiaozhong Xu, State College, PA (US)

(73) Assignee: Tencent America LLC, Palo Alto, CA (US)

( * ) Notice: Subject to any disclaimer, the term of this patent is extended or adjusted under 35 U.S.C. 154(b) by 315 days.

(21) Appl. No.: 17/828,755

(22) Filed: May 31, 2022

(65) Prior Publication Data

US 2022/0391167 A1    Dec. 8, 2022

Related U.S. Application Data

(60) Provisional application No. 63/196,066, filed on Jun. 2, 2021.

(51) Int. Cl.
| G06F 3/16 | (2006.01) |
| G10L 15/22 | (2006.01) |
| H04R 3/04 | (2006.01) |

(52) U.S. Cl.
CPC .............. *G06F 3/165* (2013.01); *G10L 15/22* (2013.01); *H04R 3/04* (2013.01)

(58) Field of Classification Search
CPC ............ G06F 3/165; G10L 15/22; H04R 3/04
See application file for complete search history.

(56) References Cited

U.S. PATENT DOCUMENTS

| 2017/0063960 A1 | 3/2017 | Stockhammer et al. |
| 2022/0263883 A1* | 8/2022 | Lee .......... G10L 19/24 |
| 2022/0383881 A1* | 12/2022 | Shahbazi Mirzahasanloo ............ G10L 19/005 |

FOREIGN PATENT DOCUMENTS

| JP | 2018532146 A | 11/2018 |
| KR | 20200078537 A | 7/2020 |
| WO | 2021015484 A1 | 1/2021 |

OTHER PUBLICATIONS

International Search Report and Written Opinion in PCT/US2022/072731, mailed Aug. 30, 2022, 7 pages.
Japanese Office Action issued Dec. 5, 2023 in Application No. 2022-566186. (10 pages).

* cited by examiner

*Primary Examiner* — David L Ton
(74) *Attorney, Agent, or Firm* — ArentFox Schiff LLP

(57) ABSTRACT

Aspects of the disclosure provide methods and apparatuses (e.g., client devices and server devices) for audio processing. In some examples, a client device includes processing circuitry. The processing circuitry transmits, to a server device, a selection signal indicative of an audio encoding configuration for encoding audio content in an audio input. The processing circuitry receives, from the server device, an encoded bitstream in response to the transmitting of the selection signal. The encoded bitstream includes the audio content that is encoded according to the audio encoding configuration. The processing circuitry renders audio signals based on the encoded bitstream.

20 Claims, 7 Drawing Sheets

ADAPTIVE AUDIO DELIVERY AND RENDERING

INCORPORATION BY REFERENCE

This present disclosure claims the benefit of priority to U.S. Provisional Application No. 63/196,066, "Adaptive Audio Delivery and Rendering" filed on Jun. 2, 2021, which is incorporated by reference herein in its entirety.

TECHNICAL FIELD

The present disclosure describes embodiments generally related to audio processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In an application of virtual reality or augmented reality, to make a user have the feeling of presence in the virtual world of the application, audio in a virtual scene of the application is perceived as in real world, with sounds coming from associated virtual figures of the virtual scene. In some examples, physical movement of the user in the real world is perceived as having matching movement in the virtual scene in the application. Further, and importantly, the user can interact with the virtual scene using audio that is perceived as realistic and matches the user's experience in the real world.

SUMMARY

Aspects of the disclosure provide methods and apparatuses (e.g., client devices and server devices) for audio processing. In some examples, a client device includes processing circuitry. The processing circuitry transmits, to a server device, a selection signal indicative of an audio encoding configuration for encoding audio content in an audio input. The processing circuitry receives, from the server device, an encoded bitstream in response to the transmitting of the selection signal. The encoded bitstream includes the audio content that is encoded according to the audio encoding configuration. The processing circuitry renders audio signals based on the encoded bitstream.

In some embodiments, the audio encoding configuration includes a bitrate for encoding the audio content. In some examples, the audio encoding configuration includes a categorization layer corresponding to a portion of the audio content in the audio input.

In some examples, an identifier associated with an audio encoding configuration is transmitted from the client device to the server device.

In some examples, the audio encoding configuration is determined according to at least one of a media processing capability of the client device, a network connection of the client device, and a preference input by a user of the client device.

In some examples, the audio encoding configuration includes a bitrate for encoding the audio content. In an example, the encoded bitstream includes one or more audio channels that are encoded according to the bitrate. In another example, the encoded bitstream includes one or more audio objects that are encoded according to the bitrate. In another example, the encoded bitstream includes a set of audio higher order ambisonics (HOA) signals that are encoded according to the bitrate.

For example, the audio encoding configuration includes a categorization layer corresponding to a portion of the audio content in the audio input. In an example, the encoded bitstream is encoded based on a subset of audio channels in the audio content of the audio input. The subset of audio channels corresponds to the categorization layer of the audio content in the audio input. In another example, the encoded bitstream is encoded based on a subset of audio objects in the audio content of the audio input. The subset of audio objects corresponds to the categorization layer of the audio content in the audio input. In another example, the encoded bitstream is encoded based on a reduced order set of the HOA signals in the audio content of the audio input. The reduced order set of the HOA signals corresponds to the categorization layer of the audio content in the audio input.

Aspects of the disclosure also provide a non-transitory computer-readable medium storing instructions which when executed by a computer cause the computer to perform the method of audio processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Aspects of the disclosure provide techniques for adaptive audio content delivery and rendering. According to an aspect of the disclosure, audio content delivery and rendering are often constrained by various factors, such as rendering device capability, network condition, user preference, etc. To address these constrains, adaptive audio content delivery and rendering schemes can be used.

Figure 1:
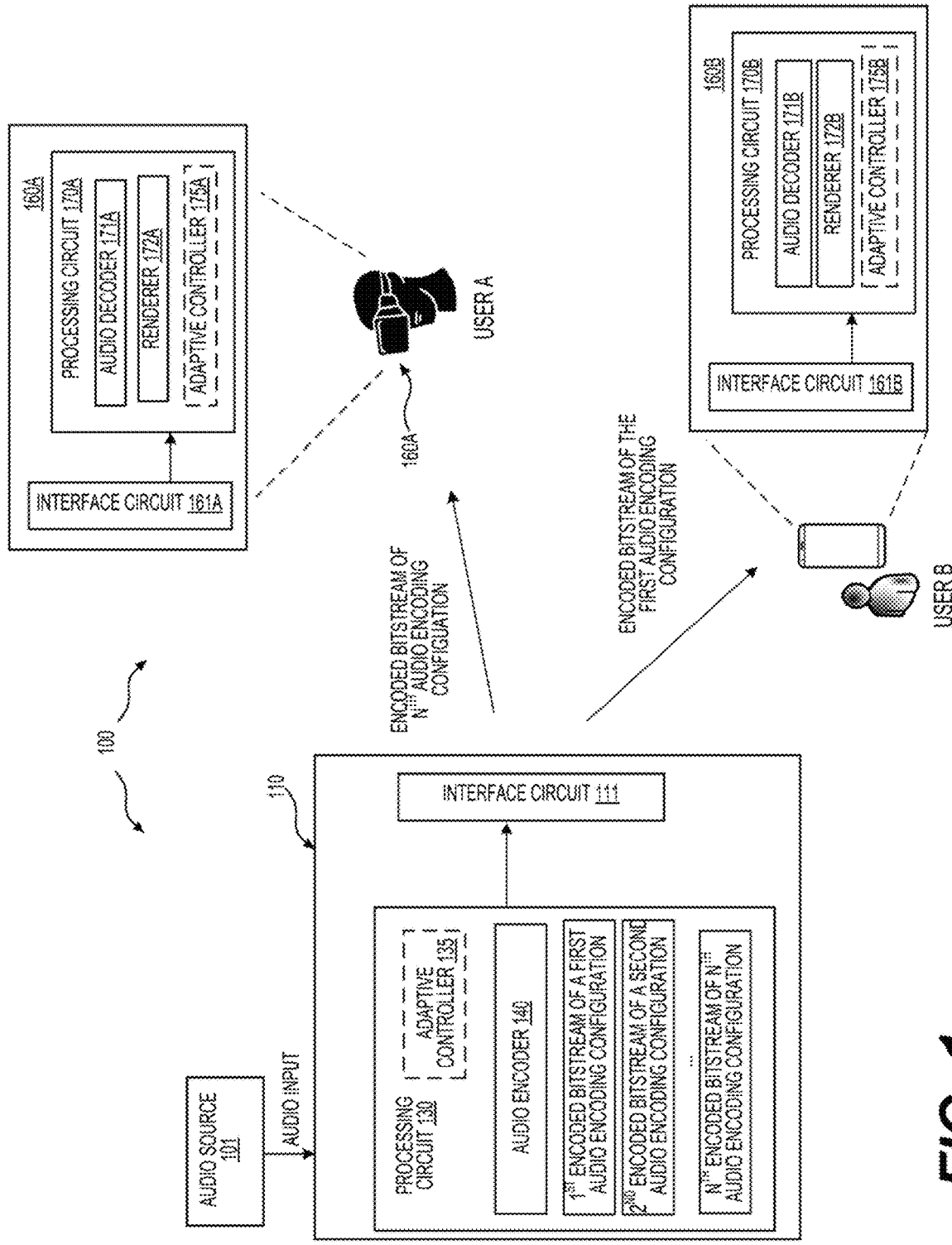
FIG. 1 shows a block diagram of a media system according to some embodiments of the disclosure.

FIG. 1 shows a block diagram of a media system (100) according to an embodiment of the disclosure. The media system (100) can be used in various use applications, such as immersive media application, augmented reality (AR) application, virtual reality application, video game application, sports game animation application, a teleconference and telepresence application, a media streaming application, and the like.

The media system (100) includes a media server device (110) and a plurality of media client devices, such as media client devices (160A) and (160B) shown in FIG. 1, that can be connected by a network (not shown). In an example, the media server device (110) can include one or more devices with audio coding and video coding functionalities. In an example, the media server device (110) includes a single computing device, such as a desktop computer, a laptop computer, a server computer, a tablet computer and the like. In another example, the media server device (110) includes data center(s), server farm(s), and the like. The media server device (110) can receive video and audio content, and compress the video content and audio content into one or more encoded bitstreams in accordance to suitable media coding standards. The encoded bitstreams can be delivered to the media client devices (160A) and (160B) via the network.

The media client devices (e.g., the media client devices (160A) and (160B)) respectively include one or more devices with video coding and audio coding functionality for media applications. In an example, each of the media client devices includes a computing device, such as a desktop computer, a laptop computer, a server computer, a tablet computer, a wearable computing device, a head mounted display (HMD) device, and the like. The media client device can decode the encoded bitstream in accordance to suitable media coding standards. The decoded video contents and audio contents can be used for media play.

The media server device (110) can be implemented using any suitable technology. In the FIG. 1 example, the media server device (110) includes a processing circuit (130) and an interface circuit (111) coupled together.

The processing circuit (130) can include any suitable processing circuitry, such as one or more central processing units (CPUs), one or more graphics processing units (GPUs), application specific integrated circuit, and the like. In the FIG. 1 example, the processing circuit (130) can be configured to include various encoders, such as an audio encoder (140), a video encoder (not shown), and the like. In an example, one or more CPUs and/or GPUs can execute software to function as the audio encoder (140). In another example, the audio encoder (140) can be implemented using application specific integrated circuits.

The interface circuit (111) can interface the media server device (110) with the network. The interface circuit (111) can include a receiving portion that receives signals from the network and a transmitting portion that transmits signals to the network. For example, the interface circuit (111) can transmit signals that carry the encoded bitstreams to other devices, such as the media client device (160A), the media client device (160B), and the like via the network. The interface circuit (111) can receive signals from the media client devices, such as the media client devices (160A) and (160B).

The network is suitably coupled with the media server device (110) and the media client devices (e.g., the media client devices (160A) and (160B)) via wired and/or wireless connections, such as Ethernet connections, fiber-optic connections, WiFi connections, cellular network connections and the like. The network can include network server devices, storage devices, network devices and the like. The components of the network are suitably coupled together via wired and/or wireless connections.

The media client devices (e.g., the media client devices (160A) and (160B)) are respectively configured to decode the coded bitstreams. In an example, each media client device can perform video decoding to reconstruct a sequence of video frames that can be displayed and can perform audio decoding to generate audio signals for playing.

The media client devices, such as the media client devices (160A) and (160B) can be implemented using any suitable technology. In the FIG. 1 example, the media client device (160A) is shown, but not limited to a head mounted display (HMD) with earphones as user equipment that can be used by user A, and the media client device (160B) is shown, but not limited to a smart phone that is used by user B.

In FIG. 1, the media client device (160A) includes an interface circuit (161A), and a processing circuit (170A) coupled together as shown in FIG. 1, and the media client device (160B) includes an interface circuit (161B), and a processing circuit (170B) coupled together as shown in FIG. 1.

The interface circuit (161A) can interface the media client device (160A) with the network. The interface circuit (161A) can include a receiving portion that receives signals from the network and a transmitting portion that transmits signals to the network. For example, the interface circuit (161A) can receive signals carrying data, such as signals carrying the encoded bitstream from the network.

The processing circuit (170A) can include suitable processing circuitry, such as CPU, GPU, application specific integrated circuits and the like. The processing circuit (170A) can be configured to include various components, such an audio decoder (171A), a renderer (172A), and the like.

In some examples, the audio decoder (171A) can decode audio content in an encoded bitstream by selecting a decoding tool suitable for a scheme by which the audio content was encoded. Further, the renderer (172A) can generate a final digital product suitable for the media client device (160A) from audio content decoded from the encoded bitstream. It is noted that the processing circuit (170A) can include other suitable components (not shown), such as mixer, post processing circuit, and the like for further audio processing.

Similarly, the interface circuit (161B) can interface the media client device (160B) with the network. The interface circuit (161B) can include a receiving portion that receives signals from the network and a transmitting portion that transmits signals to the network. For example, the interface circuit (161B) can receive signals carrying data, such as signals carrying the encoded bitstream from the network.

The processing circuit (170B) can include suitable processing circuitry, such as CPU, GPU, application specific integrated circuits and the like. The processing circuit (170B) can be configured to include various components, such an audio decoder (171B), a renderer (172B), and the like.

In some examples, the audio decoder (171B) can decode audio content in an encoded bitstream by selecting a decoding tool suitable for a scheme by which the audio content was encoded. Further, the renderer (172B) can generate a final digital product suitable for the media client device (160B) from audio content decoded from the encoded bitstream. It is noted that the processing circuit (170A) can include other suitable components (not shown), such as mixer, post processing circuit, and the like for further audio processing.

According to an aspect of the disclosure, media client devices may have different media processing capability, such as different CPU configuration, different memory configuration, and the like. For a same encoded bitstream, some media client devices may render audio from the coded bitstream without any issue, yet some media client devices may not be able to render the audio successfully due to a lack of processing capability. According to another aspect of the disclosure, network condition, such as bandwidth, latency, may impact the rendering as well. In addition, users of the media client devices may like personalization, and may have the preference on how to render audio.

According to some aspects of the disclosure, the media system (100) is configured with adaptive audio delivery and rendering techniques. The adaptive audio delivery and rendering techniques can adjust audio delivery and rendering while taking considerations of the various constraints, such as the media processing capability constraint, the network condition constraint, user preference constraint, and the like, such that the auditory experience can be optimized.

According to some aspects of the disclosure, an audio input can be encoded into encoded bitstreams of different audio encoding configurations. The media server device (110) and/or a media client device can select, for the media client device, an encoded bitstream of a suitable audio encoding configuration based on the various constraints, and the encoded bitstream can be delivered to the media client device and audio output can be rendered by the media client device based on the encoded bitstream.

In some embodiments, the media server device (110) is configured to select suitable audio encoding configurations respectively for the media client devices. In some examples, the processing circuit (130) includes an adaptive controller (135) configured to select suitable audio encoding configurations respectively for the media client devices.

In some examples, the media server device (110) receives audio input from an audio source (101) (e.g., an audio injection server in an example). The audio encoder (140) can encode the audio input into encoded bitstreams of different audio encoding configurations. An audio encoding configuration can include one or more parameters that affect audio encoding, such as a bitrate, a categorization layer, and the like.

In some examples, the audio encoding configurations have different bitrates, and the audio input is encoded into the encoded bitstreams according to the different bitrates. In some examples, the audio encoding configurations have different categorization layers, and the audio input is encoded into the encoded bitstreams according to the different categorization layers. In some examples, an audio encoding configuration can include both a bitrate and a categorization layer. The audio encoding configurations have different bitrates and/or different categorization layers, and the audio input is encoded into the encoded bitstreams according to the different bitrates and/or the different categorization layers.

In some on demand streaming applications, the media server device (110) can encode the audio content of an entire program according to different audio encoding configurations, and can store the encoded bitstreams. Generally, the media server device (110) can be configured to have a relatively large storage capability (compared to the media client devices) to store the encoded bitstreams of different audio encoding configurations. The encoded bitstreams of different audio encoding configurations can be provided to respective media client devices adaptively, for example, based on respective media processing capability of the media client devices, respective network conditions of the media client devices, respective user preferences of the media client devices, and the like.

In some real time streaming applications, the media server device (110) can receive, in real time, a portion of audio content of a program, and encode the portion the audio content according to different audio encoding configurations. The encoded bitstreams can be buffered. Generally, the media server device (110) can be configured to have a relatively large media processing capability (compared to the media client devices) to encode at real time the portion of the audio content according to the different audio encoding configurations and have a relatively large storage capability (compared to the media client devices) to buffer the encoded bitstreams of different audio encoding configurations. The encoded bitstreams of different audio encoding configurations can be provided to respective media client devices adaptively, for example, based on respective media processing capability of the media client devices, respective network conditions of the media client devices, respective user preferences of the media client devices, and the like.

For example, in the FIG. 1 example, the first encoded bitstream is encoded based on a first audio encoding configuration, such as a lowest bitrate, a lowest categorization layer, a lowest quality, and the like; the second encoded bitstream is encoded based on a second audio encoding configuration, such as a middle bitrate, a middle categorization layer, a middle quality, and the like; and the Nth encoded bitstream is encoded based on a Nth audio encoding configuration, such as a highest bitrate, a highest categorization layer, a highest quality and the like).

In some examples, the adaptive controller (135) selects one of the encoded bitstreams for a media client device considering one or more of the constraints associated with the media client device, such as the media processing capability constraint, the network condition constraint, user preference constraint, and the like. The selected encoded bitstream is then transmitted to the media client device, for example via the network. In some examples, one or more of the constraints may change, and in response to the constraint change, the adaptive controller (135) can decide to switch to another encoded bitstream and transmit the other encoded bitstream to the media client device.

In an example, the media client device (160A) is a VR equipment used by user A in a gaming application. The VR equipment is configured to have sufficient processing capability for video and audio processing, and gaming application prefers high quality audio for user experience. The adaptive controller (135) can obtain configurations of the media client device (160A) and obtain network condition information. The configurations of the media client device (160A) indicate sufficient processing capability for audio processing and thus no processing capability constraint, and the network condition information indicates enough bandwidth and no network connection constraint, and then the adaptive controller (135) can select the Nth encoded bitstream of Nth audio encoding configuration to transmit to the media client device (160A).

In an example, the media client device (160B) is a smart phone used by user B at an airport in a teleconference. The smart phone may have limited processing capability for video and audio processing, and the teleconference does not require high quality audio for user experience. The adaptive controller (135) can obtain configurations of the media client device (160B) and obtain network condition information. The configurations of the media client device (160B) indicate limited processing capability for audio processing, and the network condition information indicates limited bandwidth at the airport, and then the adaptive controller (135) can select the first encoded bitstream of the first audio encoding configuration to transmit to the media client device (160B).

In some embodiments, a media client device can select a suitable audio encoding configuration based on the various constraints, and can inform/request the media server device (110) accordingly. The media server device (110) then transmits an encoded bitstream that is encoded using the suitable audio encoding configuration to the media client device. In some examples, when one or more constraints change, the media client device can determine to switch to another audio encoding configuration, and inform the media server device (110) accordingly. The media server device (110) then transmits another encoded bitstream that is encoded according to the other audio encoding configuration to the media client device.

In the FIG. 1 example, the media client device (160A) includes an adaptive controller (175A) configured to select a suitable audio encoding configuration based on various constraints associated with the media client device (160A); and the media client device (160B) includes an adaptive controller (175B) configured to select a suitable audio encoding configuration based on various constraints associated with the media client device (160B).

In an example, the adaptive controller (175A) can obtain configurations of the media client device (160A) and obtain network condition information. The configurations of the media client device (160A) indicate sufficient processing capability for audio processing and thus no processing capability constraint, and the network condition information indicates enough bandwidth and no network connection constraint, and then the adaptive controller (175A) can select, for example, the Nth audio encoding configuration.

In an example, the adaptive controller (175B) can obtain configurations of the media client device (160B) and obtain network condition information. The configurations of the media client device (160B) indicate limited processing capability for audio processing, and the network condition information indicates limited bandwidth at the airport, and then the adaptive controller (175B) can select, for example, the first audio encoding configuration.

According to some aspects of the disclosure, the audio input injected into the media client server (110) may have various formats for transmission and reproduction, such as audio channels, audio objects, a set of higher order ambisonics (HOA) signals, or a combination of two or more of them.

According to an aspect of the disclosure, audio content of a scene can be in a format of audio channels associated with locations in a sound field of the scene. For example, the audio channels may be associated with speakers in a sound system. Sound systems can have various multichannel configurations. In some examples, the speakers in a sound system may be arranged around audience in three vertical layers, that are referred to as upper layer, middle layer and lower layer.

Figure 2:
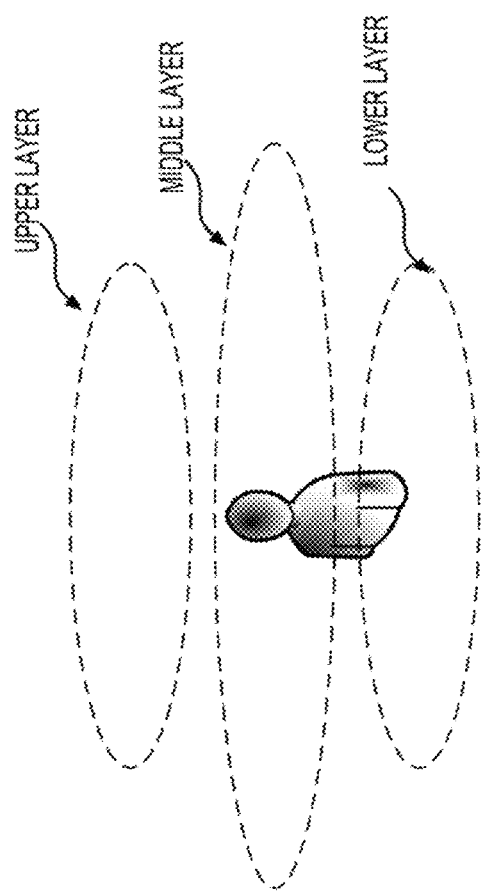
FIG. 2 shows a vertical three-layer sound system layout in some examples.

FIG. 2 shows a vertical three-layer speaker layout around an audience.

According to an aspect of the disclosure, audio content in a multichannel format includes multiple audio channels for locations in the sound field.

Figure 3A:
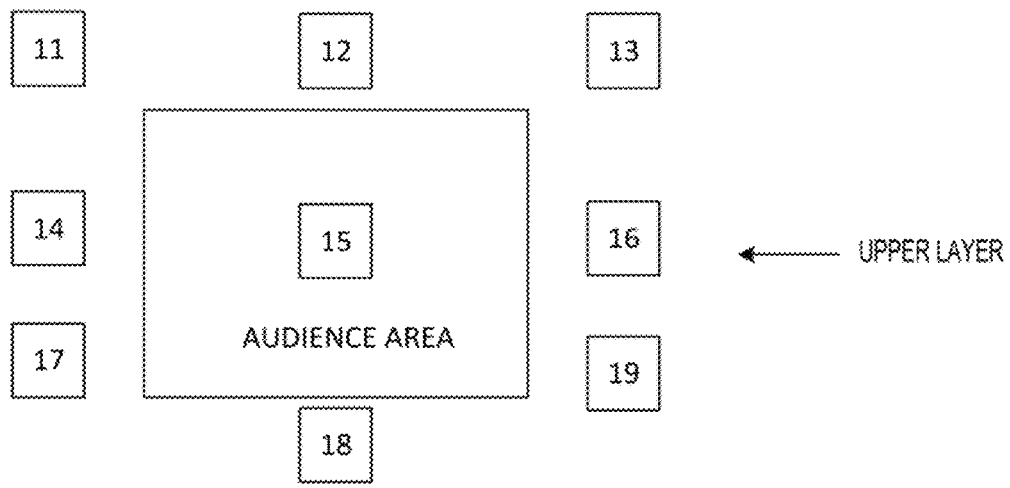
FIGS. 3A-3C shows speaker arrangement in a sound system in some examples.
Figure 3B:
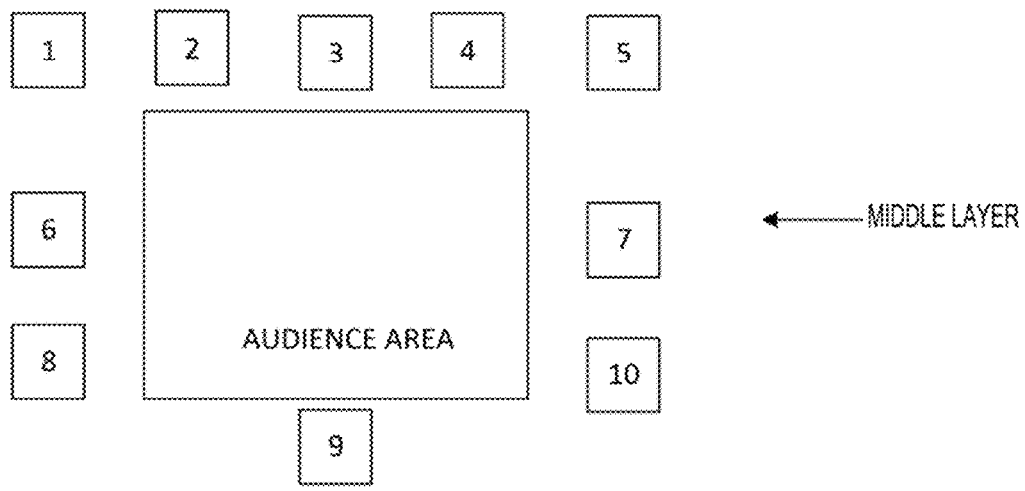
Figure 3C:
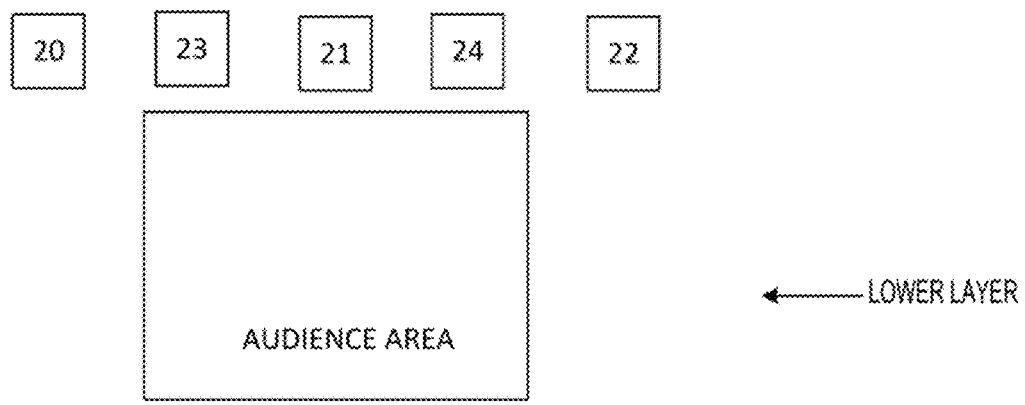

FIGS. 3A-3C shows speaker arrangement of the upper layer, middle layer and lower layer in a sound system. The sound system is denoted by 22.2 multichannel sound system, and can play 22.2 multichannel audio content. The 22.2 multichannel audio content includes 24 audio channels. In an example, the 24 audio channels can correspond to 24 speaker locations in the sound system. The 24 audio channels include two low frequency effects (LFE) channels. Small squares in FIGS. 3A-3C represent speaker locations, and the numbers in the small squares are indices for the speaker locations. FIG. 3A shows speaker arrangement in the upper layer, FIG. 3B shows speaker arrangement in the middle layer, FIG. 3C shows speaker arrangement in the lower layer. In an example, speaker locations 23 and 24 may be for the two LFE channels.

Some sound systems may have less number of speakers, and 22.2 multichannel audio content can be down mixed to form audio content of less audio channels.

In an example, a sound system denoted by 2.0 multichannel sound system may include two speaker locations, the 22.2 multichannel audio content can be down mixed to form 2.0 multichannel audio content that includes two audio channels corresponding to the two speaker locations. In another example, a sound system denoted by 5.1 multichannel sound system may include 6 speaker locations, and the 22.2 multichannel audio content can be down mixed to form 5.1 multichannel audio content that includes 6 audio channels corresponding to the 6 speaker locations. In another example, a sound system denoted by 9.2 multichannel sound system may include 11 speaker locations, and the 22.2 multichannel audio content can be down mixed to form 9.2 multichannel audio content that includes 11 audio channels corresponding to the 11 speaker locations.

It is noted that audio content of less number of channels can be represented by less number of bits, and can request less delivery and rendering resources.

According to another aspect of the disclosure, audio content of a scene can be in a format of multiple audio objects associated with sound sources in a sound field of the scene.

Figure 4:
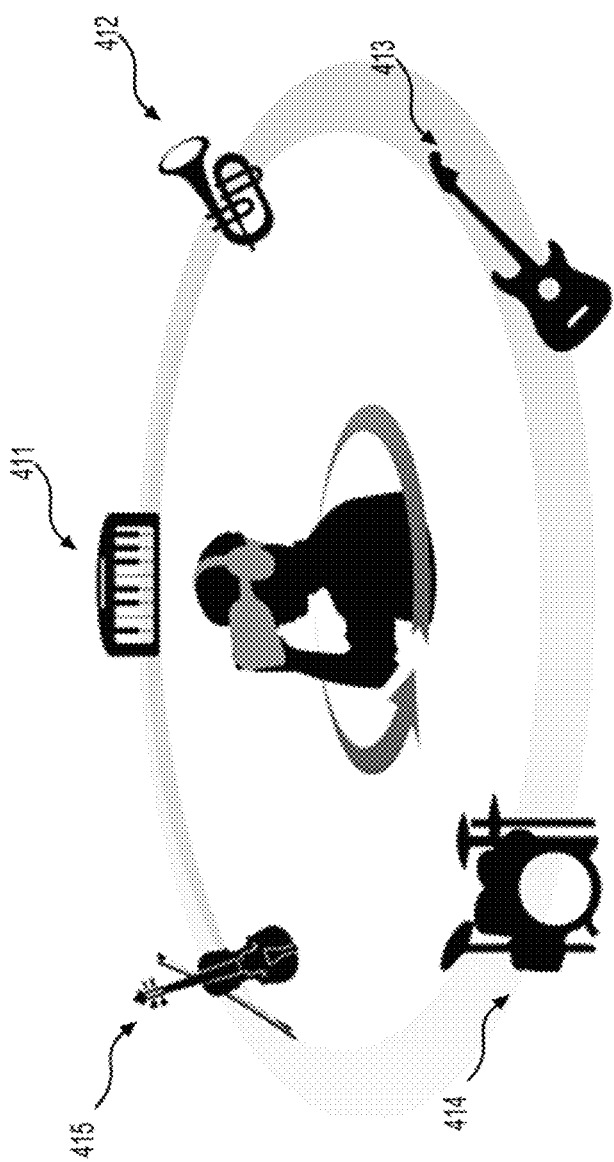
FIG. 4 shows an example of multiple sound sources in a sound field of a scene in some examples.

FIG. 4 shows an example of multiple sound sources (411)-(415) in a sound field of a scene in a VR application. An audio content for the scene can include audio objects respectively for the sound sources (411)-(415).

In another example, a hospital audio scene can have a sound field setting as in a doctor office. The sound field can include a doctor, a patient, a television, a radio, a door, a table and a chair as sound sources. Thus, an audio content for the scene can include 7 audio objects respectively for the sound sources. For example, a first audio object corresponds to sound of the doctor, a second audio object corresponds to sound of the patient, a third audio object corresponds to sound of the television, a fourth audio object corresponds to sound of the radio, a fifth audio object corresponds to sound of the door, a sixth audio object corresponds to sound of the table, a seventh audio object corresponds to sound of the chair.

According to another aspect of the disclosure, audio content of a scene can be in a format of a set of HOA.

Ambisonic is a full-sphere surround sound format. In addition to the horizontal plane, ambisonic covers sound sources above and below the listener. The transmission channels of ambisonic do not carry speaker signals. Instead, the transmission channels include a speaker-independent representation of a sound field called B-format, which is then decoded according to the speaker setup. Ambisonic allows the reproduction to think in terms of source directions rather than loudspeaker positions, and offers the listener a considerable degree of flexibility as to the layout and number of speakers used for playback.

In an example, a first order ambisonic can be understood as a three-dimensional extension of mid/side (M/S) stereo, adding additional difference channels for height and depth. The resulting signal set is called B-format, and includes four component channels that are labelled W for the sound pressure (the M in M/S), X for the front-minus-back sound pressure gradient, Y for left-minus-right (the S in M/S) and Z for up-minus-down.

The spatial resolution of the first order ambisonic can be improved by using higher order ambisonic. For example, the first order ambisonic has slightly blurry sources, but also to a comparably small usable listening area or sweet spot. The spatial resolution can be increased and the sweet spot enlarged by adding groups of more selective directional components to the B-format. The resulting signal set is then called second order ambisonic, third order ambisonic, or collectively, higher order ambisonics (HOA). Generally, a set of higher order ambisonic includes more selective directional components in addition to a set of lower order ambisonic.

According to some aspect of the disclosure, the audio input to the media server device (110) can be encoded at several different bitrates (corresponding to the audio encoding configurations). In some examples, the media client server (110) can select or switch among encoded bitstreams of different bitrates. In some examples, the media client devices, such as the media client devices (160A) and (160B) can select or switch among encoded bitstreams of different bitrates. For example, the selection or switch can depend on available resources (e.g., processing capability, network bandwidth), and/or user preferences, and the like.

In some embodiments, the audio input includes audio content in the format of audio channels. The audio channels are encoded at several different bitrates. For example, the audio channels are encoded at a first bitrate (corresponding to the first audio encoding configuration) to form the first encoded bitstream; the audio channels are encoded at a second bitrate (corresponding to the second audio encoding configuration) to form the second encoded bitstream; and so on. In some examples, the media client server (110) can select or switch among encoded bitstreams of different bitrates (corresponding to different audio encoding configurations). In some examples, the media client devices, such as the media client devices (160A) and (160B) can select or switch among encoded bitstreams of different bitrates (corresponding to different audio encoding configurations). For example, the selection or switch can depend on available resources (e.g., processing capability, network bandwidth), and/or user preferences, and the like.

In some embodiments, the audio input includes audio content in the format of audio objects. The audio objects are encoded at several different bitrates. For example, the audio objects are encoded at a first bitrate (corresponding to the first audio encoding configuration) to form the first encoded bitstream; the audio objects are encoded at a second bitrate (corresponding to the second audio encoding configuration) to form the second encoded bitstream at a second bitrate. In some examples, the media client server (110) can select or switch among encoded bitstreams of different bitrates (corresponding to different audio encoding configurations). In some examples, the media client devices, such as the media client devices (160A) and (160B) can select or switch among encoded bitstreams of different bitrates (corresponding to different audio encoding configurations). For example, the selection or switch can depend on available resources (e.g., processing capability, network bandwidth), and/or user preferences, and the like.

In some embodiments, the audio input includes audio content in the format of a set of HOA signals, such as a set of a second order ambisonic signals, a set of a third order ambisonic signals, a set of fourth order ambisonic signals and the like. The audio content in HOA format is encoded at several different bitrates. For example, the audio content in HOA format is encoded at a first bitrate (corresponding to the first audio encoding configuration) to form the first encoded bitstream; the audio content in HOA format is encoded at a second bitrate (corresponding to the second audio encoding configuration) to form the second encoded bitstream at a second bitrate. In some examples, the media client server (110) can select or switch among encoded bitstreams of different bitrates (corresponding to different audio encoding configurations). In some examples, the media client devices, such as the media client devices (160A) and (160B) can select or switch among encoded bitstreams of different bitrates (corresponding to different audio encoding configurations). For example, the selection or switch can depend on available resources (e.g., processing capability, network bandwidth), and/or user preferences, and the like.

In some embodiments, a quality identifier (ID) is assigned with a bitrate. The media server device (110) or content creator can use the quality ID to indicate which bitrate to use for encoding the audio input into encoded bitstream for delivery. A media client device, such as the media client device (160A) or the media client device (160B) can request specific quality ID based on available resources (e.g., processing capability, network bandwidth), and/or user preferences, and the like.

It is noted that the audio content of the audio scene can be in a mixed format that mixes audio channel, audio object, HOA, etc. In some examples, when the audio content is in a mixed format of two or more of audio channels, audio objects, and HOA, encoding bitrates may be separately applied to the audio channels, the audio objects, or the HOA signals. In some examples, when the audio content is in a mixed format of two or more of audio channels, audio objects, and HOA, encoding bitrates may be applied to combinations of the audio channels, the audio objects, and the HOA signals.

According to some aspects of the disclosure, the audio content in the audio input to the media server device (110) can be categorized into several categorization layers. In some examples, each categorization layer can include a portion of audio content in the audio input. In some examples, a higher categorization layer can include the lower categorization layer and additional portion of the audio content in the audio input. Thus, the categorization layers can be parameters in the audio encoding configurations. In some examples, the media client server (110) can select or switch among encoded bitstreams of different categorization layers (corresponding to the audio encoding configurations). In some examples, the media client devices, such as the media client devices (160A) and (160B) can select or switch among encoded bitstreams of different categorization layers (corresponding to the audio encoding configurations). For example, the selection or switch can depend on available resources (e.g., processing capability, network bandwidth), and/or user preferences, and the like.

In some embodiments, the audio input includes audio content in the format of audio channels. The audio channels can be categorized into several categorization layers.

For example, an audio input includes audio content in the format of 22.2 multichannel audio content. In an example, the 22.2 multichannel audio content can be categorized into four categorization layers: a first categorization layer of 2.0 multichannel audio content; a second categorization layer of 5.1 multichannel audio content; a third categorization layer of 9.2 multichannel audio content; and a fourth categorization layer of 22.2 multichannel audio content. The 2.0 multichannel audio content can be encoded into the first encoded bitstream (of the first audio encoding configuration); 5.1 multichannel audio content can be encoded into the second encoded bitstream (of the second audio encoding configuration); the 9.2 multichannel audio content can be encoded into the third encoded bitstream (of the third audio encoding configuration); and the 22.2 multichannel audio content can be encoded into the fourth encoded bitstream (of the fourth audio encoding configuration).

In some examples, the media client server (110) can select or switch among encoded bitstreams of different categorization layers. In some examples, the media client devices, such as the media client devices (160A) and (160B) can select or switch among encoded bitstreams of different categorization layers. For example, the selection or switch can depend on available resources (e.g., processing capability, network bandwidth), and/or user preferences, and the like.

The above description is an example of audio channel categorization. It is noted that the 22.2 multichannel audio content can be categorized differently from the above description in some examples.

In another embodiment, the audio objects are categorized into several categorization layers. Using the hospital audio scene as an example, the audio content for the hospital audio scene can include 7 audio objects respectively for the sound sources: a first audio object corresponding to sound of the doctor, a second audio object corresponding to sound of the patient, a third audio object corresponding to sound of the television, a fourth audio object corresponding to sound of the radio, a fifth audio object corresponding to sound of the door, a sixth audio object corresponding to sound of the table, and a seventh audio object corresponding to sound of the chair.

In an example, the 7 audio objects can be categorized into third categorization layers. The first categorization layer includes the first audio object corresponding to sound of the doctor and the second audio object corresponding to sound of the patient. The second categorization layer includes the first audio object corresponding to sound of the doctor, the second audio object corresponding to sound of the patient, the third audio object corresponding to the sound of television and the fourth audio object corresponding to the sound of the radio. The third categorization layer includes the first audio object corresponding to sound of the doctor, the second audio object corresponding to sound of the patient, the third audio object corresponding to the sound of television, the fourth audio object corresponding to the sound of the radio, the fifth audio object corresponding to sound of the door, the sixth audio object corresponding to sound of the table, and the seventh audio object corresponding to sound of the chair.

The first categorization layer can be encoded into the first encoded bitstream (of the first audio encoding configuration); the second categorization layer can be encoded into the second encoded bitstream (of the second audio encoding configuration); the third categorization layer can be encoded into the third encoded bitstream (of the third audio encoding configuration). In some examples, the media client server (110) can select or switch among encoded bitstreams of different categorization layers. In some examples, the media client devices, such as the media client devices (160A) and (160B) can select or switch among encoded bitstreams of different categorization layers. For example, the selection or switch can depend on available resources (e.g., processing capability, network bandwidth), and/or user preferences, and the like.

The above description is an example of audio object categorization. It is noted that audio scene with audio objects can be categorized differently from the above description in some examples.

In another embodiment, the HOA signals are categorized into several categorization layers according to different orders. In an example, a set of HOA signals in the fourth order can be categorized into four categorization layers. The first categorization layer includes a set of HOA signals in the first order. The second categorization layer includes a set of HOA signals in the second order. The third categorization layer includes a set of HOA signals in the third order. The fourth categorization layer includes the set of HOA signal in the fourth order.

The first categorization layer can be encoded into a first encoded bitstream (of a first audio encoding configuration); the second categorization layer can be encoded into a second encoded bitstream (of a second audio encoding configuration); the third categorization layer can be encoded into a third encoded bitstream (of a third audio encoding configuration); the fourth categorization layer can be encoded into a fourth encoded bitstream (of a fourth audio encoding configuration). In some examples, the media client server (110) can select or switch among encoded bitstreams of different categorization layers (corresponding to the different audio encoding configurations). In some examples, the media client devices, such as the media client devices (160A) and (160B) can select or switch among encoded bitstreams of different categorization layers (corresponding to the different audio encoding configurations). For example, the selection or switch can depend on available resources (e.g., processing capability, network bandwidth), and/or user preferences, and the like.

The above description is an example of HOA categorization. It is noted that the HOA signals can be categorized differently from the above description in some examples.

In some embodiments, layer identifiers (IDs) can be assigned for the categorization layers of the audio input. The server device or content creator can use the layer ID to indicate which layer(s) of the audio input is delivered; the client device can request specific layer ID based on available resources, and/or user preferences, etc.

It is noted that the audio content of the audio scene can be in a mixed format that mixes audio channel, audio object, HOA, etc. In some examples, when the audio content is in a mixed format of two or more of audio channels, audio objects, and HOA, categorization layers may be separately determined according to the audio channels, the audio objects, or the HOA signals. In some examples, when the audio content is in a mixed format of two or more of audio channels, audio objects, and HOA, categorization layers may be determined based on combinations of the audio channels, the audio objects, and the HOA signals.

Figure 5:
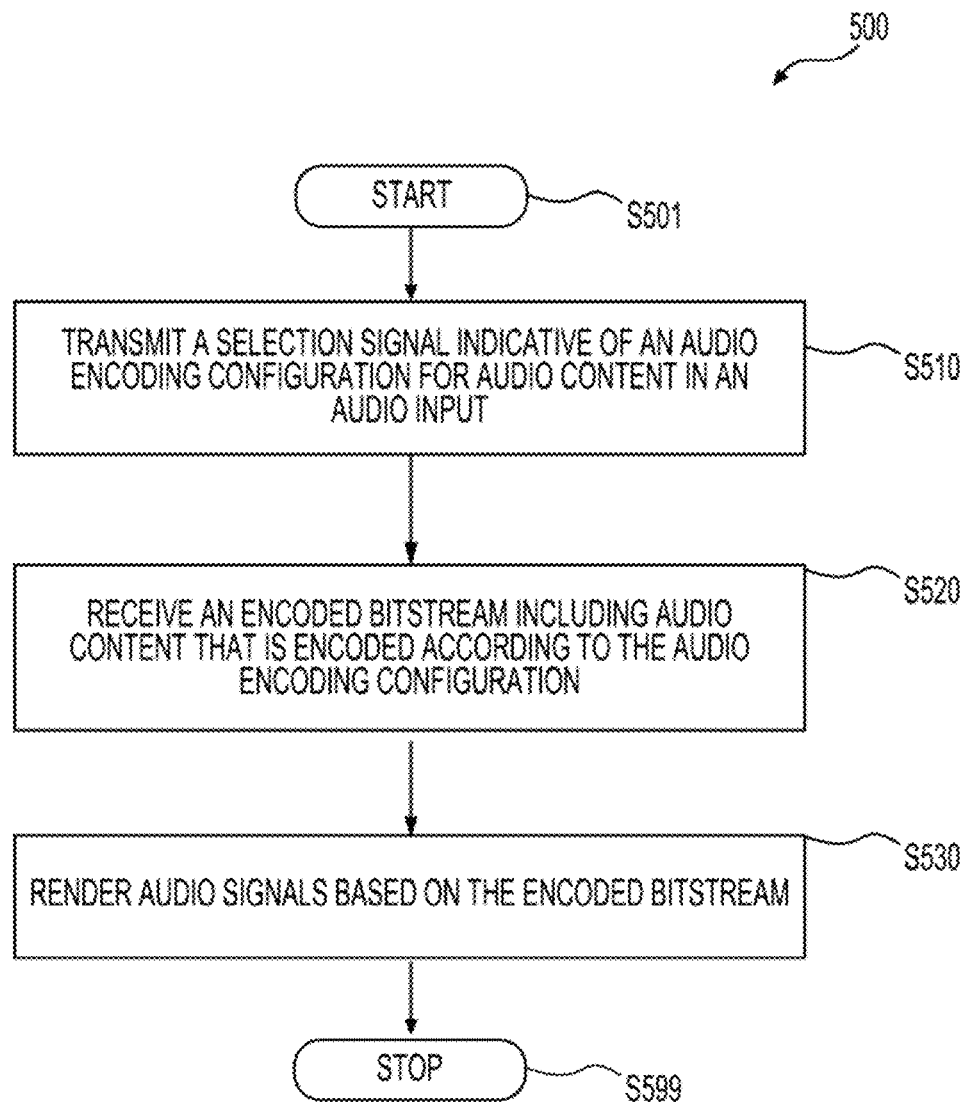
FIG. 5 shows a flow chart outlining a process example according to an embodiment of the disclosure.

FIG. 5 shows a flow chart outlining a process (500) according to an embodiment of the disclosure. The process (500) can be used in a client device for audio processing, such as used in the media client devices (160A) and (160B), and executed by the processing circuit (170A) and the processing circuit (170B), and the like. In some embodiments, the process (500) is implemented in software instructions, thus when the processing circuitry executes the software instructions, the processing circuitry performs the process (500). The process starts at (S5301) and proceeds to (S510).

At (S510), a selection signal is transmitted by the client device. The selection signal is indicative of an audio encoding configuration for encoding audio content in an audio input.

In some examples, the audio encoding configuration includes a bitrate for encoding the audio content. In some examples, the audio encoding configuration includes a categorization layer corresponding to a portion in the audio content of the audio input.

In an example, an identifier (e.g., a quality identifier, a categorization identifier) associated with an audio encoding configuration is transmitted.

In an example, the selection signal is determined according to at least one of a media processing capability of the client device, a network connection of the client device, and a preference input by a user of the client device.

At (S520), an encoded bitstream is received in response to the transmitting of the selection signal. The encoded bitstream includes the audio content that is encoded according to the audio encoding configuration.

In some examples, the audio encoding configuration includes a bitrate. In an example, the encoded bitstream includes a plurality of audio channels that are encoded according to the bitrate. In another example, the encoded bitstream includes a plurality of audio objects that are encoded according to the bitrate. In another example, the encoded bitstream includes a set of audio higher order ambisonics (HOA) signals that are encoded according to the bitrate.

In some examples, the audio encoding configuration includes a categorization layer. In an example, the encoded bitstream includes (is encoded based on) a subset of audio channels in the audio content of the audio input. The subset of audio channels corresponds to the categorization layer. In another example, the encoded bitstream includes (is encoded based on) a subset of audio objects in the audio content of the audio input. The subset of audio objects corresponds to the categorization layer. In another example, the encoded bitstream includes (is encoded based on) a reduced order set of the HOA signals in the audio content of the audio input. The reduced order set of the HOA signals corresponds to the categorization layer.

At (S530), audio signals are rendered according to the encoded bitstream. Then, the process proceeds to (S599) and terminates.

The process (500) can be suitably adapted. Step(s) in the process (500) can be modified and/or omitted. Additional step(s) can be added. Any suitable order of implementation can be used.

Figure 6:
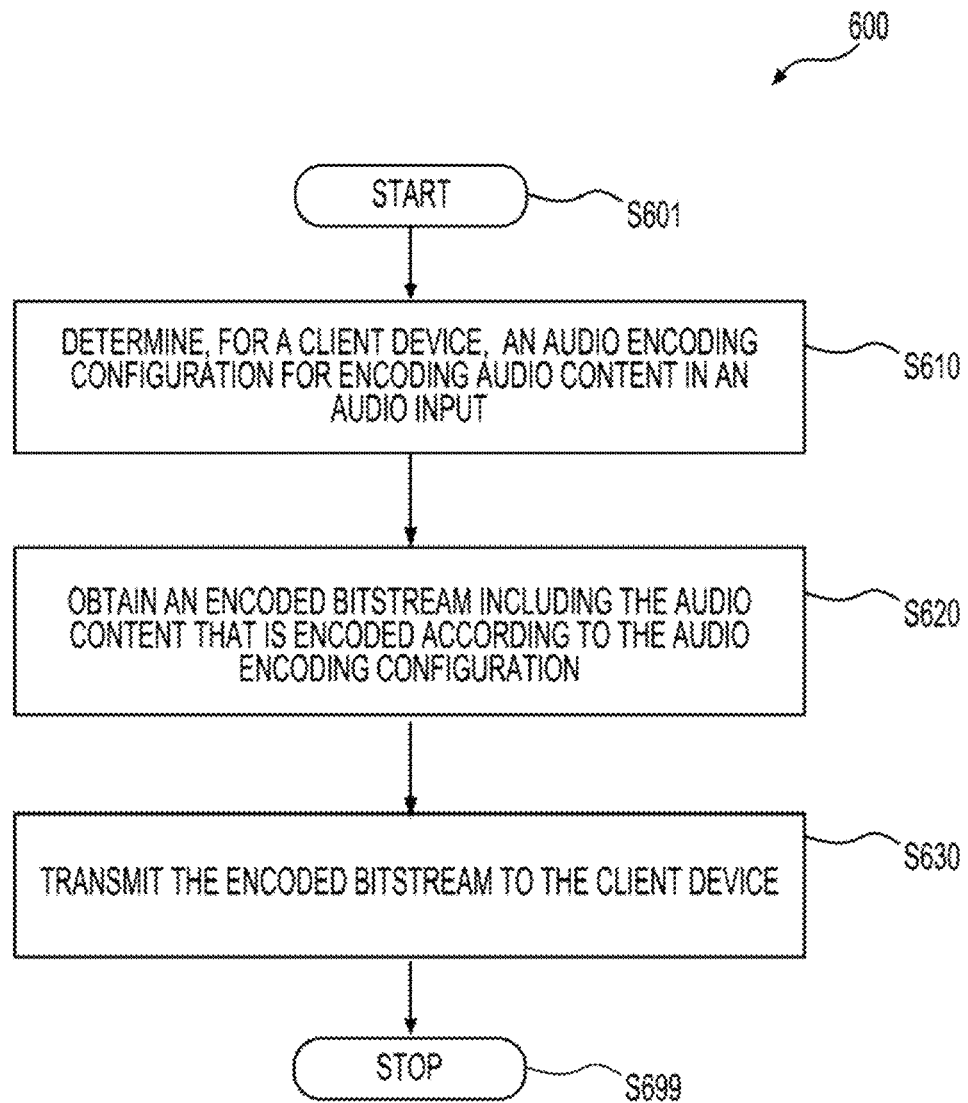
FIG. 6 shows a flow chart outlining another process example according to an embodiment of the disclosure.

FIG. 6 shows a flow chart outlining a process (600) according to an embodiment of the disclosure. The process (600) can be used in a server device for audio processing, such as used in the media server device (110), and executed by the processing circuit (130), and the like. In some embodiments, the process (600) is implemented in software instructions, thus when the processing circuitry executes the software instructions, the processing circuitry performs the process (600). The process starts at (S601) and proceeds to (S610).

At (S610), the server device determines, for a client device (e.g., the media client device (160A), the media client device (160B), and the like), an audio encoding configuration for encoding audio content in an audio input.

In some examples, the audio encoding configuration includes a bitrate for encoding the audio content. In some examples, the audio encoding configuration includes a categorization layer corresponding to a portion in the audio content of the audio input.

In some examples, the server device determines the audio encoding configuration according to at least one of a media processing capability of the client device, a network connection of the client device, and a preference input.

At (S620), the server device obtains an encoded bitstream including the audio content that is encoded according to the audio encoding configuration.

In some examples, the audio encoding configuration includes a bitrate. In an example, the encoded bitstream includes a plurality of audio channels that are encoded according to the bitrate. In another example, the encoded bitstream includes a plurality of audio objects that are encoded according to the bitrate. In another example, the encoded bitstream includes a set of audio higher order ambisonics (HOA) signals that are encoded according to the bitrate.

In some examples, the audio encoding configuration includes a categorization layer. In an example, the encoded bitstream includes (is encoded based on) a subset of audio channels in the audio content of the audio input. The subset of audio channels corresponds to the categorization layer. In another example, the encoded bitstream includes (is encoded based on) a subset of audio objects in the audio content of the audio input. The subset of audio objects corresponds to the categorization layer. In another example, the encoded bitstream includes (is encoded based on) a reduced order set of the HOA signals in the audio content of the audio input. The reduced order set of the HOA signals corresponds to the categorization layer.

At (S630), the encoded bitstream is transmitted to the client device. In some examples, the server device also transmits an identifier (ID) (e.g., a quality identifier, a categorization layer identifier and the like) indicative of the audio encoding configuration that is used to encode the audio content of the audio input.

Then, the process proceeds to (S699) and terminates.

The process (600) can be suitably adapted. Step(s) in the process (600) can be modified and/or omitted. Additional step(s) can be added. Any suitable order of implementation can be used.

The techniques described above, can be implemented as computer software using computer-readable instructions and physically stored in one or more computer-readable media. For example, FIG. 7 shows a computer system (700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
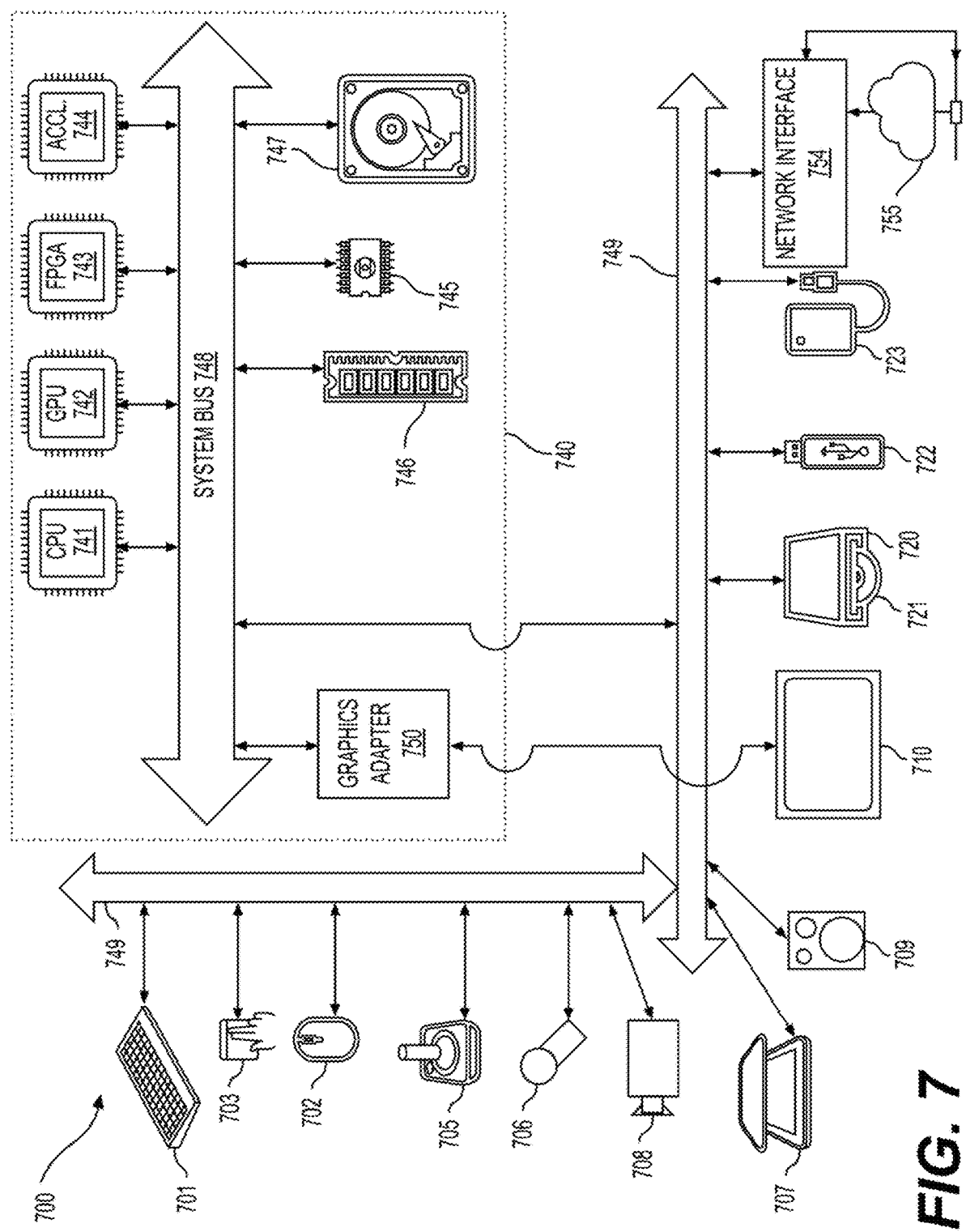
FIG. 7 is a schematic illustration of a computer system in accordance with an embodiment.

The components shown in FIG. 7 for computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can be also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various embodiments of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hard-wired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of audio processing at a client device, comprising:
   transmitting, to a server device, a selection signal indicative of an audio encoding configuration for encoding audio content in an audio input, wherein the selection signal is indicative of at least one categorization layer of a plurality of categorization layers, each of the plurality of categorization layers including a different subset of the audio content in the audio input and being assigned a respective layer identifier (ID);
   receiving, from the server device, an encoded bitstream including the audio content that is encoded according to the audio encoding configuration in response to the transmitting of the selection signal; and
   rendering audio signals based on the encoded bitstream.

2. The method of claim 1, wherein the transmitting the selection signal further comprises:
   transmitting the selection signal indicative of a bitrate for encoding the audio content.

3. The method of claim 2, wherein the receiving the encoded bitstream further comprises:
   receiving the encoded bitstream including one or more audio channels that are encoded according to the bitrate.

4. The method of claim 2, wherein the receiving the encoded bitstream further comprises:
   receiving the encoded bitstream including one or more audio objects that are encoded according to the bitrate.

5. The method of claim 2, wherein the receiving the encoded bitstream further comprises:
   receiving the encoded bitstream including audio higher order ambisonics (HOA) signals that are encoded according to the bitrate.

6. The method of claim 1, wherein
   each of the plurality of categorization layers includes a different combination of audio channels, audio objects, or audio higher order ambisonics (HOA) signals.

7. The method of claim 6, wherein the receiving the encoded bitstream further comprises:
   receiving the encoded bitstream that is encoded based on a subset of audio channels in the audio content of the audio input, each of the plurality of categorization layers including a different subset of the audio channels.

8. The method of claim 6, wherein the receiving the encoded bitstream further comprises:
   receiving the encoded bitstream that is encoded based on a subset of audio objects in the audio content of the audio input, each of the plurality of categorization layers including a different subset of the audio objects.

9. The method of claim 6, wherein the receiving the encoded bitstream further comprises:
   receiving the encoded bitstream that is encoded based on a reduced order set of higher order ambisonics (HOA) signals in the audio content of the audio input, each of the plurality of categorization layers including a different subset of the audio objects.

10. The method of claim 1, wherein the transmitting the selection signal further comprises:
    transmitting the layer ID associated with the audio encoding configuration.

11. The method of claim 1, further comprising:
    determining the selection signal according to at least one of a media processing capability of the client device, a network connection of the client device, and a preference input.

12. An apparatus for audio processing, comprising processing circuitry configured to:
    transmit, to a server device, a selection signal indicative of an audio encoding configuration for encoding audio content in an audio input, wherein the selection signal is indicative of at least one categorization layer of a plurality of categorization layers, each of the plurality of categorization layers including a different subset of the audio content in the audio input and being assigned a respective layer identifier (ID);
    receive, from the server device, an encoded bitstream including the audio content that is encoded according to the audio encoding configuration in response to the transmitting of the selection signal; and
    render audio signals based on the encoded bitstream.

13. The apparatus of claim 12, wherein the processing circuitry configured to:
    transmit the selection signal indicative of a bitrate for encoding the audio content.

14. The apparatus of claim 13, wherein the processing circuitry configured to:
    receive the encoded bitstream including one or more audio channels that are encoded according to the bitrate.

15. The apparatus of claim 13, wherein the processing circuitry configured to:
    receive the encoded bitstream including one or more audio objects that are encoded according to the bitrate.

16. The apparatus of claim 13, wherein the processing circuitry configured to:
    receive the encoded bitstream including audio higher order ambisonics (HOA) signals that are encoded according to the bitrate.

17. The apparatus of claim 12, wherein
    each of the plurality of categorization layers includes a different combination of audio channels, audio objects, or audio higher order ambisonics (HOA) signals.

18. The apparatus of claim 17, wherein the processing circuitry configured to:
    receive the encoded bitstream that is encoded based on a subset of audio channels in the audio content of the audio input, each of the plurality of categorization layers including a different subset of the audio channels.

19. The apparatus of claim 17, wherein the processing circuitry configured to:
receive the encoded bitstream that is encoded based on a subset of audio objects in the audio content of the audio input, each of the plurality of categorization layers including a different subset of the audio channels.

20. The apparatus of claim 17, wherein the processing circuitry configured to:
receive the encoded bitstream that is encoded based on a reduced order set of higher order ambisonics (HOA) signals in the audio content of the audio input, each of the plurality of categorization layers including a different subset of the audio channels.

* * * * *